US011416001B2

(12) United States Patent
Thode et al.

(10) Patent No.: US 11,416,001 B2
(45) Date of Patent: Aug. 16, 2022

(54) SYSTEMS AND METHODS FOR VEHICLE POSITION CALIBRATION USING RACK LEG IDENTIFICATION

(71) Applicant: Crown Equipment Corporation, New Bremen, OH (US)

(72) Inventors: Justin Forbes Thode, Auckland (NZ); Grace Da-In Lee, Christchurch (NZ)

(73) Assignee: Crown Equipment Corporation, New Bremen, OH (US)

(*) Notice: Subject to any disclaimer, the term of this patent is extended or adjusted under 35 U.S.C. 154(b) by 496 days.

(21) Appl. No.: 16/513,876

(22) Filed: Jul. 17, 2019

(65) Prior Publication Data

US 2020/0026304 A1  Jan. 23, 2020

Related U.S. Application Data

(60) Provisional application No. 62/699,392, filed on Jul. 17, 2018.

(51) Int. Cl.
*A01B 69/00* (2006.01)
*B62D 6/00* (2006.01)
(Continued)

(52) U.S. Cl.
CPC ......... *G05D 1/0242* (2013.01); *B66F 9/0755* (2013.01); *G05D 1/0246* (2013.01);
(Continued)

(58) Field of Classification Search
CPC .. G05D 1/0242; G05D 1/0246; G05D 1/0261; G05D 1/0272; G05D 1/0234;
(Continued)

(56) References Cited

U.S. PATENT DOCUMENTS 4,957,408 A   9/1990  Ohkura
8,425,173 B2  4/2013  Lert et al.
(Continued)

FOREIGN PATENT DOCUMENTS

DE   19925131 A1   12/2000
EP    0508793 A1   10/1992
(Continued)

OTHER PUBLICATIONS

International Search Report and Written Opinion relating to International Application No. PCT/US2019/042127 dated Nov. 12, 2019.
(Continued)

*Primary Examiner* — Abby Y Lin
*Assistant Examiner* — Sohana Tanju Khayer
(74) *Attorney, Agent, or Firm* — Dinsmore & Shohl, LLP (57) ABSTRACT

A materials handling vehicle includes a camera, an odometry module to generate odometry data, a processor, and a drive mechanism. The camera captures images of an identifier for a racking system aisle and at least a rack leg portion positioned in the aisle. The processor uses the identifier to generate information indicative of an initial rack leg position and rack leg spacing in the aisle, generate an initial vehicle position using the initial rack leg position, generate a vehicle odometry-based position in the aisle using odometry data and the initial vehicle position, detect a subsequent rack leg using a captured image, correlate the detected subsequent rack leg with an expected vehicle position using rack leg spacing, generate an odometry error signal based on a difference between the expected vehicle position and the vehicle odometry-based position, and update the vehicle odometry-based position using the odometry error signal.

19 Claims, 7 Drawing Sheets

(51) Int. Cl.
    *B62D 11/00* (2006.01)
    *B62D 12/00* (2006.01)
    *B63G 8/20* (2006.01)
    *B63H 25/04* (2006.01)
    *G05D 1/00* (2006.01)
    *G06F 7/00* (2006.01)
    *G06F 17/00* (2019.01)
    *G06F 19/00* (2018.01)
    *G05D 1/02* (2020.01)
    *G06T 7/80* (2017.01)
    *G06T 7/70* (2017.01)
    *B66F 9/075* (2006.01)
    *B65G 1/00* (2006.01)

(52) U.S. Cl.
    CPC ......... *G05D 1/0261* (2013.01); *G05D 1/0272* (2013.01); *G06T 7/70* (2017.01); *G06T 7/80* (2017.01); *B65G 1/00* (2013.01); *B65G 2207/40* (2013.01); *G05D 1/0234* (2013.01); *G05D 2201/0216* (2013.01); *G06T 2207/30252* (2013.01)

(58) Field of Classification Search
    CPC . G05D 2201/0216; B66F 9/0755; G06T 7/70; G06T 7/80; G06T 2207/30252; B65G 1/00; B65G 2207/40
    See application file for complete search history.

(56) References Cited

U.S. PATENT DOCUMENTS

| | | | |
|---|---|---|---|
| 8,508,590 B2 | 8/2013 | Laws et al. | |
| 8,538,577 B2 | 9/2013 | Bell et al. | |
| 8,548,671 B2 | 10/2013 | Wong et al. | |
| 8,589,012 B2 | 11/2013 | Wong et al. | |
| 8,594,923 B2 | 11/2013 | Wong et al. | |
| 9,170,581 B2 | 10/2015 | Bell et al. | |
| 9,174,830 B1 | 11/2015 | Bell | |
| 9,188,982 B2 | 11/2015 | Thomson | |
| 9,349,181 B2 | 5/2016 | Chandrasekar et al. | |
| 9,354,070 B2 | 5/2016 | Thomson et al. | |
| 9,488,984 B1* | 11/2016 | Williams | G06K 9/2036 |
| 9,580,285 B2 | 2/2017 | Wong et al. | |
| 9,776,794 B2 | 10/2017 | Sullivan et al. | |
| 9,811,088 B2 | 11/2017 | Walton et al. | |
| 9,880,009 B2 | 1/2018 | Bell | |
| 9,881,379 B2 | 1/2018 | Iimura | |
| 9,908,702 B2 | 3/2018 | Elazary et al. | |
| 9,921,067 B2 | 3/2018 | Fanselow et al. | |
| 9,984,467 B2 | 5/2018 | Chandrasekar et al. | |
| 10,429,188 B2 | 10/2019 | Robinson et al. | |
| 10,450,001 B2 | 10/2019 | Stewart et al. | |
| 10,455,226 B2 | 10/2019 | Thomson et al. | |
| 10,671,087 B2 | 6/2020 | Collett et al. | |
| 10,775,805 B2 | 9/2020 | Kaylor et al. | |
| 2008/0202856 A1 | 8/2008 | Fossier | |
| 2013/0173435 A1 | 7/2013 | Cozad, Jr. | |
| 2014/0198206 A1* | 7/2014 | Murray | G05D 1/0234 348/135 |
| 2016/0189366 A1 | 6/2016 | Chamberlain et al. | |
| 2016/0221755 A1 | 8/2016 | Sullivan et al. | |
| 2016/0327955 A1* | 11/2016 | Walton | G05D 1/0261 |
| 2017/0270579 A1 | 9/2017 | Ridao Carlini et al. | |
| 2018/0022549 A1 | 1/2018 | Sullivan et al. | |
| 2018/0057329 A1 | 3/2018 | Poschi et al. | |
| 2018/0088586 A1* | 3/2018 | Hance | G06Q 10/0832 |
| 2018/0143624 A1 | 5/2018 | Schulz et al. | |
| 2018/0143638 A1* | 5/2018 | Walton | G05D 1/0291 |
| 2019/0265722 A1 | 8/2019 | Haeusler et al. | |
| 2020/0026304 A1 | 1/2020 | Thode et al. | |
| 2020/0039353 A1 | 2/2020 | Chandrasekar | |
| 2020/0054842 A1* | 2/2020 | Thawer | A61M 5/20 |
| 2020/0247613 A1 | 8/2020 | Thode et al. | |
| 2020/0249692 A1 | 8/2020 | Thode et al. | |
| 2020/0264625 A1 | 8/2020 | Estep et al. | |

FOREIGN PATENT DOCUMENTS

| | | | |
|---|---|---|---|
| EP | 1408001 | A1 | 4/2004 |
| EP | 2863284 | A | 4/2015 |
| WO | 9835276 | A1 | 8/1998 |
| WO | 2016179532 | A1 | 11/2016 |
| WO | 2017022048 | A1 | 9/2017 |

OTHER PUBLICATIONS

International Search Report and Written Opinion dated May 26, 2020 relating to U.S. International Application No. PCT/US2020/016567.

International Search Report and Written Opinion relating to International Application No. PCT/US2020/016566 dated Jul. 28, 2020.

International Search Report and Written Opinion issued by the European Patent Office acting as International Search Authority for International Application No. PCT/US2020/016580 dated Jun. 16, 2020 (13 pages).

Examination Report dated Apr. 11, 2021 pertaining to European Patent Application No. 19753506.5.

* cited by examiner

SYSTEMS AND METHODS FOR VEHICLE POSITION CALIBRATION USING RACK LEG IDENTIFICATION

CROSS-REFERENCE TO RELATED APPLICATIONS

This application claims the benefit of U.S. Provisional Application Ser. No. 62/699,392, entitled "SYSTEMS AND METHODS FOR VEHICLE POSITION CALIBRATION USING RACK LEG IDENTIFICATION," filed Jul. 17, 2018, the entirety of which is incorporated by referenced herein.

TECHNICAL FIELD

The present specification generally relates to systems and methods for providing and updating localization for industrial vehicles based on a racking system in a warehouse environment and, more specifically, to systems and methods for utilization of a rack leg imaging module on an industrial vehicle and upright rack leg rails of the racking system to track and update the location of the industrial vehicle in an aisle of the warehouse based on a rack leg identification associated with the aisle.

BACKGROUND

In order to move items about an industrial environment, workers often utilize industrial vehicles, including for example, forklift trucks, hand and motor driven pallet trucks, and/or other materials handling vehicles. The industrial vehicles can be configured as an automated guided vehicle that navigates through the industrial environment or a manually guided vehicle that knows its location within the industrial environment. In order to facilitate automated guidance, navigation, or both, the industrial vehicle may be adapted for localization within the environment. That is the industrial vehicle can be adapted with sensors and processors for determining the location of the industrial vehicle within the environment such as, for example, pose and position of the industrial vehicle.

BRIEF SUMMARY

According to the subject matter of the present disclosure, a materials handling vehicle comprises a camera, an odometry module, a vehicle position calibration processor, a drive mechanism configured to move the materials handling vehicle along an inventory transit surface, and vehicle control architecture in communication with the drive mechanism. The camera is configured to capture images of (i) an aisle entry identifier positioned to correspond with an entrance of a racking system aisle of a multilevel warehouse racking system and (ii) at least a portion of a rack leg positioned in the racking system aisle. The odometry module is configured to generate odometry data representing a distance traveled by the materials handling vehicle along the inventory transit surface. The vehicle position calibration processor is configured to use the aisle entry identifier to generate racking system information indicative of at least (i) a position of an initial rack leg of the racking system aisle along the inventory transit surface and (ii) rack leg spacing in the racking system aisle, generate an initial position of the materials handling vehicle along the inventory transit surface using the position of the initial rack leg from the racking system information, and generate an odometry-based position of the materials handling vehicle along the inventory transit surface in the racking system aisle using the odometry data and the initial position of the materials handling vehicle. The vehicle position calibration processor is further configured to detect a subsequent rack leg using a captured image of at least a portion of the subsequent rack leg, correlate the detected subsequent rack leg with an expected position of the materials handling vehicle in the racking system aisle using rack leg spacing from the racking system information, compare the odometry-based position of the materials handling vehicle with the expected position of the materials handling vehicle to generate an odometry error signal based on a difference between the expected position and the odometry-based position, and update the odometry-based position of the materials handling vehicle using the odometry error signal. The vehicle control architecture is configured to navigate the materials handling vehicle along the inventory transit surface using the updated odometry-based position.

In accordance with one embodiment of the present disclosure, a materials handling vehicle comprises a camera, an odometry module, a vehicle position calibration processor, and a drive mechanism configured to move the materials handling vehicle along an inventory transit surface, wherein the camera is configured to capture images of at least (i) an aisle entry identifier for a racking system aisle of a multi-level warehouse racking system and (ii) at least a portion of a rack leg positioned in the racking system aisle. The odometry module is configured to generate materials handling vehicle odometry data, and the vehicle position calibration processor is configured to use the aisle entry identifier to generate racking system information indicative of at least (i) a position of an initial rack leg along the inventory transit surface and (ii) rack leg spacing in the racking system aisle. The vehicle position calibration processor is further configured to generate an initial position of the materials handling vehicle along the inventory transit surface using the position of the initial rack leg, generate an odometry-based position of the materials handling vehicle along the inventory transit surface in the racking system aisle using the odometry data and the initial position of the materials handling vehicle, detect a subsequent rack leg using a captured image of at least a portion of the subsequent rack leg, correlate the detected subsequent rack leg with an expected position of the materials handling vehicle in the racking system aisle using rack leg spacing from the racking system information, generate an odometry error signal based on a difference between the expected position and the odometry-based position, and update the odometry-based position of the materials handling vehicle using the odometry error signal.

In accordance with another embodiment of the present disclosure, a materials handling vehicle comprises a drive mechanism configured to move the materials handling vehicle along a horizontally-oriented inventory transit surface in a forward direction defining a front of the materials handling vehicle or a reverse direction defining a rear of the materials handling vehicle, a materials handling mechanism configured to move materials along a vertically-oriented materials handling axis, a vehicle body comprising a pair of lateral sides extending between the front and rear of the materials handling vehicle, a rack leg imaging module comprising a camera, a vertically oriented array of infrared (IR) illuminators, and an IR bandpass filter, an image capture processor, and vehicle control architecture in communication with the drive mechanism. The vertically-oriented array of IR illuminators is disposed on at least one of the pair of lateral sides of the materials handling vehicle. The camera is vertically aligned with the vertically oriented array of IR illuminators and is configured to capture images of at least a portion of a rack leg positioned in a racking system aisle of a multilevel warehouse racking system. The image capture processor is configured to generate a filtered IR rack leg image by coordinating to capture of a rack leg image of at least a portion of a rack leg with illumination of the rack leg by the vertically oriented array of IR illuminators and with band pass filtering of external warehouse lighting surrounding the rack leg from the rack leg image using the IR bandpass filter, and the vehicle control architecture is configured to navigate the materials handling vehicle along the horizontally-oriented inventory transit surface using the filtered IR rack leg image.

These and additional features provided by the embodiments described herein will be more fully understood in view of the following detailed description, in conjunction with the drawings.

BRIEF DESCRIPTION OF THE SEVERAL VIEWS OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments described herein generally relate to localization techniques for extracting features from rack leg features through use of one or more rack leg imaging modules as described herein. Localization is utilized herein to refer to any of a variety of system configurations that enable active tracking of a vehicle location in a warehouse, industrial or commercial facility, or other environment. For the purposes of defining and describing the concepts and scope of the present disclosure, it is noted that a "warehouse" encompasses any indoor or outdoor industrial facility in which materials handling vehicles transport goods including, but not limited to, indoor or outdoor industrial facilities that are intended primarily for the storage of goods, such as those where multi-level racks are arranged in aisles, and manufacturing facilities where goods are transported about the facility by materials handling vehicles for use in one or more manufacturing processes. The concepts of the present disclosure are not limited to any particular localization system configuration and are deemed to be applicable to any of a variety of conventional and yet-to-be developed localization systems. Such localizations systems may include those described in U.S. Pat. No. 9,349,181 issued on May 24, 2016, entitled LOST VEHICLE RECOVERY UTILIZING ASSOCIATED FEATURE PAIRS, and U.S. Pat. No. 9,984,467 issued May 29, 2018, entitled VEHICLE POSITIONING OR NAVIGATION UTILIZING ASSOCIATED FEATURE PAIRS.

The localization systems may be used to localize and/or navigate an industrial vehicle through a warehouse environment 150 (FIG. 1B) that includes a racking structure, which may be a warehouse, stock yard, or the like. Suitably, the rack leg features may be utilized by a rack leg imaging module to capture images of the rack leg features to initialize localization and update accumulated odometry as described herein. In some embodiments, the rack leg imaging module including a camera can be mounted to an industrial vehicle (e.g., automated guided vehicle or a manually guided vehicle) that navigates through a warehouse. The input image can be any image captured from the camera prior to extracting features from the image.

Figure 1A:
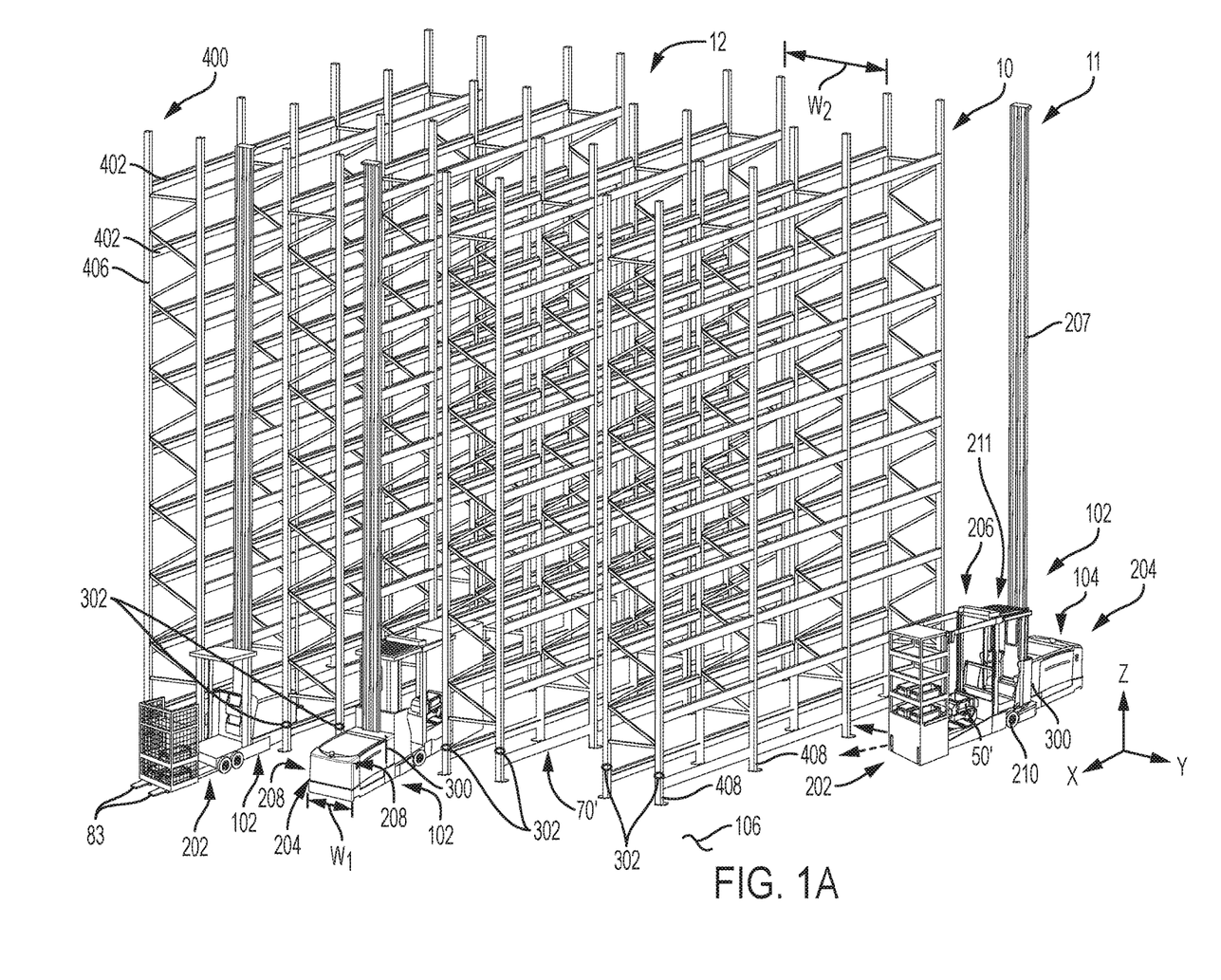
FIG. 1A depicts a plurality of vehicles for localization in a warehouse including a warehouse racking system, according to one or more embodiments shown and described herein.

Referring now to FIG. 1A, a materials handling vehicle 102 can be configured to navigate through a warehouse environment 150 (FIG. 1B) such as a warehouse 11. The materials handling vehicle 102 can comprise a drive mechanism configured to move the materials handling vehicle 102 along an inventory transit surface 106, a materials handling mechanism configured to place goods on and/or retrieve goods from a storage bay of a multilevel warehouse racking system 12 in the warehouse 11 of the warehouse environment 150, and vehicle control architecture in communication with the drive and materials handling mechanisms. In an embodiment, the materials handling mechanism is configured to move materials along a vertically-oriented materials handling axis.

The materials handling vehicle 102 can comprise an industrial vehicle for lifting and moving a payload such as, for example, a forklift truck, a reach truck, a turret truck, a walkie stacker truck, a tow tractor, a pallet truck, a high/low, a stacker-truck, trailer loader, a sideloader, a fork hoist, or the like. The industrial vehicle can be configured to automatically or manually navigate an inventory transit surface 106 of the warehouse 11 along a desired path. Accordingly, the materials handling vehicle 102 can be directed forwards and backwards by rotation of one or more wheels 210. Additionally, the materials handling vehicle 102 can be caused to change direction by steering the one or more wheels 210. Optionally, the vehicle can comprise operator controls for controlling functions of the vehicle such as, but not limited to, the speed of the wheels 210, the orientation of the wheels 210, or the like. The operator controls can comprise controls that are assigned to the functions of the materials handling vehicle 102 such as, for example, switches, buttons, levers, handles, pedals, input/output device, or the like. It is noted that the term "navigate" as used herein means movement control or route planning of a vehicle from one place to another including, but not limited to, plotting a graphical path for a manual vehicle operation, providing a set of turn by turn instructions for manual operation, or providing an automated control guiding the vehicle along a travel path that may include such turn by turn instructions for automated operation.

The warehouse 11 may include the warehouse racking system 12 having a plurality of racks 400 including a plurality of shelves defined between a set of upright rails 406 of a rack 400. Each upright rail 406 of the rack 400 has a rack leg 408 configured to be disposed on and support the upright rail 406 with respect to the inventory transit surface 106. A racking system aisle 70' for navigation of the materials handling vehicle 102 on the inventory transit surface 106 may be defined between a pair of opposing upright rails 406 of racks 400. Alternatively, the racking system aisle 70' or portions of the racking system aisle 70' may be defined by at least one rack 400 and an opposite defining component such as, but not limited to, one or more pallet stacks, a mezzanine, a virtually defined aisle boundary, or the like. Each end of the pair of opposing upright rails 406 is configured to act as an entrance end or an exit end for the materials handling vehicle 102 into the racking system aisle 70'. Aisle entry identifiers 302 may be disposed on the rack legs 408 of at least the exit and entrance ends of the pair of opposing upright rails 406 that form a racking system aisle 70'. The aisle entry identifiers 302 may include, but are not limited to, stickers or other adhesive or attachable components that include unique codes such as Quick Response (QR) codes. The QR codes may store and provide information about a rack leg 408 including, but not limited to, a position of the rack leg 408 within the warehouse 11 as stored in a warehouse map 30, described in greater detail below. The aisle entry identifier 302 may include a QR code configured to store and provide the racking system information, which may include information about a hole pattern associated with a set of rack legs 408 of the racking system aisle 70' of the multilevel warehouse racking system 12, the set of rack legs 408 including the initial rack leg 408, information about distances between adjacent rack legs 408 of the set of rack legs 408, distance of a rack face of the racking system aisle 70' of the multilevel warehouse racking system 12 to a guidance wire in the racking system aisle 70', a number of rack legs 408 of the set of rack legs 408 of the racking system aisle 70' of the multilevel warehouse racking system 12, or combinations thereof. In embodiments, the information about the hole pattern may include distances between rows of holes and distances between columns of holes of each rack leg 408 of the racking system aisle 70' of the multilevel warehouse racking system 12. The racking system information may further include information regarding a distance between rack legs 408 in the racking system aisle 70', and the expected position is calculated by adding the distance between rack legs 408 in the racking system aisle 70' to a previous distance associated with a previously detected rack leg 408.

Thus, the QR codes may further store and provide information including, but not limited to, information about a hole pattern associated with a set of rack legs 408 of a rack 400 defining an outer aisle boundary, distances between rack legs 408 of the rack 400 referable to herein as a "tick" distance, the rack 400 defining the outer aisle boundary, distance from a rack face of the rack 400 to a guidance wire for a given racking system aisle 70', and decoding data configured to permit decoding of a localization target string into a target pose. The hole pattern information may include, for example, distances between rows and distances between columns of holes of a rack leg 408. The QR codes may further store and provide information about a number of rack legs 408 in a given racking system aisle 70' based on information associated with an observed rack leg 408. Thus, the QR codes may contain data about a rack leg pattern, rack leg spacing, number of rack legs, and rack distance from a materials handling vehicle 102 centerline along with a guidance wire on the inventory transit surface 106 in a racking system aisle 70' for a plurality of rack legs 408 associated with the racking system aisle 70' to allow for subsequent use of the plurality of rack legs 408 associated with the racking system aisle 70' for localization of the materials handling vehicle 102. The materials handling vehicle 102 may be configured to be disposed on a guidance system, such as the guidance wire that may be utilized as a wire guidance for vehicle navigation on the inventory transit surface 106, a guidance rail utilized for vehicle navigation on the inventory transit surface 106, or the like. It is contemplated within the scope of this disclosure that the embodiments described herein may be utilized with such types of guidance systems as described or yet-to-be-developed. In embodiments, different racking system aisles 70' in the warehouse may have different spacing between upright rails 406 of a rack 400 and different types of racking of racks 400 in the racking system 12.

Figure 1B:
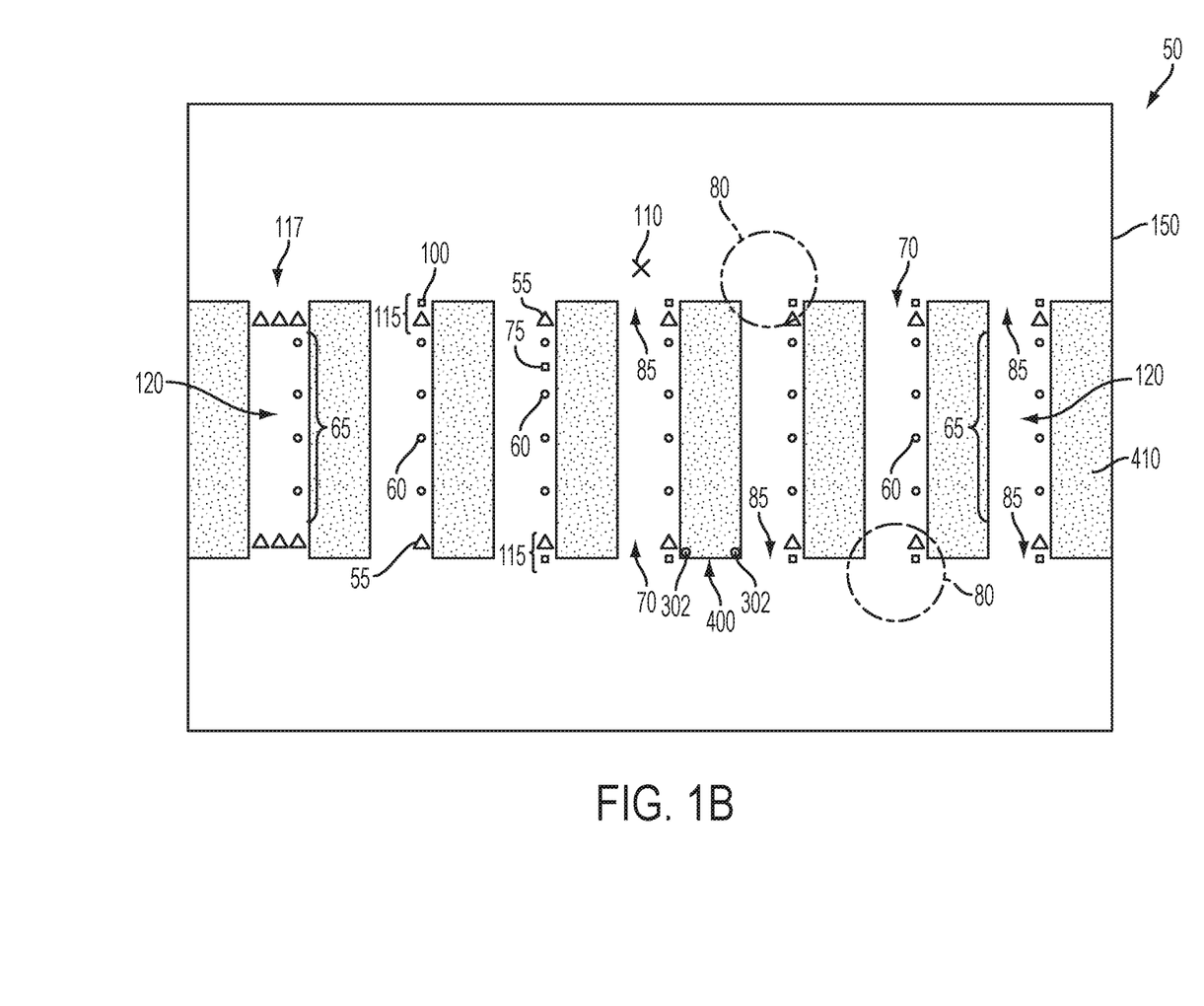
FIG. 1B depicts a schematic plan view of a warehouse environment utilizing tag reading technology, according to one or more embodiments shown and described herein.

Referring to FIG. 1B, the warehouse environment 150, which may be the warehouse 11 (FIG. 1A), may include the aisle entry identifiers 302 on a rack 400 and/or tag reading technology associated with path defining components 410 such as pallets and/or racks 400. The tag reading technology may include, for example, a tag layout 50 in a single aisle path 70 (FIG. 2) of a racking system aisle 70' (FIG. 1A), an example of which is described in U.S. Pat. No. 9,811,088 assigned to Crown Equipment Corporation. The tag layout 50 can be constructed to comprise individual tags, such as radio frequency identification (RFID) tags, that are positioned such that the materials handling vehicle 102 will operate under a defined set of vehicle functionality (e.g., vehicle function data) and/or tag-dependent position data that will endure until the materials handling vehicle 102 identifies another individual tag of the tag layout 50 with a new correlation of vehicle functionality. Information about a first rack leg 408 may be stored in, or accessible from, a table using an individual tag associated with the first rack leg 408 such as an RFID tag disposed in a floor surface at the beginning of a racking system aisle 70', where the first rack leg 408 may be placed at the beginning of the racking system aisle 70' or further down the racking system aisle 70'. As a non-limiting example, a set of pallets may be placed in an aisle prior to a rack 400 including the first rack leg 408, and the RFID tag may be placed at the beginning of the aisle to contain information about the first rack leg 408 and the rack 400.

In operation, by way of example and not as a limitation, the tag layout 50 may be utilized with respect to a tag reader 33 and the reader module 35 of the materials handling vehicle 102 (FIG. 2), examples of which are also described in U.S. Pat. No. 9,811,088 assigned to Crown Equipment Corporation. The reader module 35 may include a reader memory coupled to a reader processor. The tag reader 33 and the reader module 35 may cooperate to identify individual tags of a tag layout 50. Each individual tag of the tag layout 50 may correspond to a unique identification code, such as a code including rack leg information of a rack leg 408 associated with an individual tag at the beginning of the aisle path 70 of the racking system aisle 70', for example. Each unique identification code corresponds to a memory location in the reader memory of the reader module 35, which memory location includes at least one of indexing data, operational data, and tag position data. As a non-limiting example, the tag reader 33 and the reader module 35 cooperate to determine vehicle functionality by identifying an individual tag of the tag layout 50 and associating the identified tag with a memory location in the reader memory to retrieve at least one of indexing data, operational data, and tag position data. The individual tags comprise a plurality of zone identification tags 55 and a plurality of zone tags 60. Each zone identification tag 55 occupies a position in the tag layout 50 that corresponds to a unique set of zone tags 65 that each comprise a plurality of zone tags 60. In one embodiment, each unique set of zone tags 65 comprises a plurality of zone tags 60, one or more function tags 100, one or more aisle extension tags 110, one or more aisle entry tags 75, or combinations thereof. For example, and not by way of limitation, respective zone tags 60 of the unique set of zone tags 65 that are the furthest from a midpoint 120 of the aisle path 70 of the racking system aisle 70' may comprise both vehicle functionality and end-of-aisle vehicle functionality.

As a non-limiting example, the individual tags of the tag layout 50 may comprise a plurality of aisle entry tags 75 that are positioned along an aisle path 70 between vehicle entry or vehicle exit portions 80 of the aisle path 70. A reader module 35 on the materials handling vehicle 102 (FIG. 2), an example of which is also described in U.S. Pat. No. 9,811,088 assigned to Crown Equipment Corporation, may discriminate between the aisle entry tags 75 and the individual tags of the tag layout 50 along the aisle path 70 and correlate end-of-aisle vehicle functionality with an identified aisle entry tag 75. A vehicle controller may control operational functions of the industrial vehicle hardware of the materials handling vehicle 102 in response to the correlation of end-of-aisle vehicle functionality with an identified aisle entry tag 75. In this manner, a tag layout 50 can be constructed to comprise aisle entry tags 75 that are positioned within an aisle path 70 of the racking system aisle 70' such that particular end-of-aisle vehicle functionality can be implemented as an industrial vehicle 10, traveling within an aisle path 70 of the racking system aisle 70', approaches the vehicle entry or vehicle exit portion 80 of the aisle path 70. The exit portion distance is a quantity of length measured between a current position of the materials handling vehicle 102 and the end point 85 of respective aisle paths 70. The reader module 35 may discriminate between the outer end-cap tag and the inner end-cap tag of the end-cap pair 115 and correlate an identified outer end-cap tag with exit-specific vehicle functionality and correlate an identified inner end-cap tag with entry-specific vehicle functionality. In one embodiment, the tag layout 50 may comprise one or more end-cap rows 117 which comprise a plurality of end-cap pairs 115. The one or more end-cap rows 117 are spaced across respective end points 85 of an aisle path 70 such that an industrial vehicle entering or exiting the aisle path 70 will identify the individual tags of the end-cap row 117 regardless of where the materials handling vehicle 102 crosses the end-cap row 117 within the vehicle entry or vehicle exit portion 80 of the aisle path 70.

The materials handling vehicle 102 can further comprise a rack leg imaging module 300 including a camera 304 (FIG. 2) for capturing images such as input images of rack leg features. The camera 304 can be any device capable of capturing the visual appearance of an object and transforming the visual appearance into an image. Accordingly, the camera 304 can comprise an image sensor such as, for example, a charge coupled device, complementary metal-oxide-semiconductor sensor, or functional equivalents thereof. In some embodiments, the materials handling vehicle 102 can be located within the warehouse 11 and be configured to capture images of a rack leg 408 of an upright rail 406 of a rack 400 in the warehouse 11. In order to capture rack leg images, the camera 304 can be mounted to at least one lateral side 208 of the materials handling vehicle 102 and have a field of view laterally focused toward the rack leg 408, as described in greater detail below. For the purpose of defining and describing the present disclosure, the term "image" as used herein can mean a representation of the appearance of a detected object. The image can be provided in a variety of machine readable representations such as, for example, JPEG, JPEG 2000, Exif, TIFF, raw image formats, GIF, BMP, PNG, Netpbm format, WEBP, raster formats, vector formats, or any other format suitable for capturing rack leg uprights.

The materials handling vehicle 102 includes a vehicle body 104. The vehicle body 104 may include a fork side 202 and a power unit side 204. In embodiments, the fork side 202 may define a front of the materials handling vehicle 102 configured to move in a forward direction along an inventory transit surface 106 that is horizontally-oriented, and the power unit side 204 may define a rear of the materials handling vehicle 102 configured to move in a reverse direction along the inventory transit surface 106. The fork side 202 may include a pair of fork tines 83. In embodiments, the vehicle body 104 may include a fork carriage assembly 206 positioned at the fork side 202 that may be movably coupled to a mast assembly 207. The fork carriage assembly 206 may be vertically movable along the mast assembly 207 to retrieve or deposit a tote 50' with respect to a rack 400, which may be a multilevel rack in a very narrow aisle (VNA) warehouse. The materials handling vehicle 102 may include a sensor location on the fork side 202, the power unit side 204, or both to facilitate autonomous or semiautonomous vehicle travel. The materials handling vehicle 102 may also comprise an operator compartment 211 that may also be movably coupled to the mast assembly 207. This operator compartment 211 may be positioned between the fork carriage assembly 206 and the power unit side 204 of the vehicle body 104. The vehicle body 104 may also include a pair of lateral sides 208 extending between the fork side 202 and the power unit side 204 of the vehicle body 104. The pair of lateral sides 208 thus extend between the front and rear of the materials handling vehicle 102. The pair of lateral sides 208 may define a width $W_1$. In VNA environments, a warehouse aisle such as a racking system aisle 70' in which the materials handling vehicle 102 may be positioned may be characterized by an aisle width $W_2$, where $W_2-W_1<W$ inches and W is in a range of from about 2 inches to about 4 inches (and $W_2>W_1$).

Figure 4:
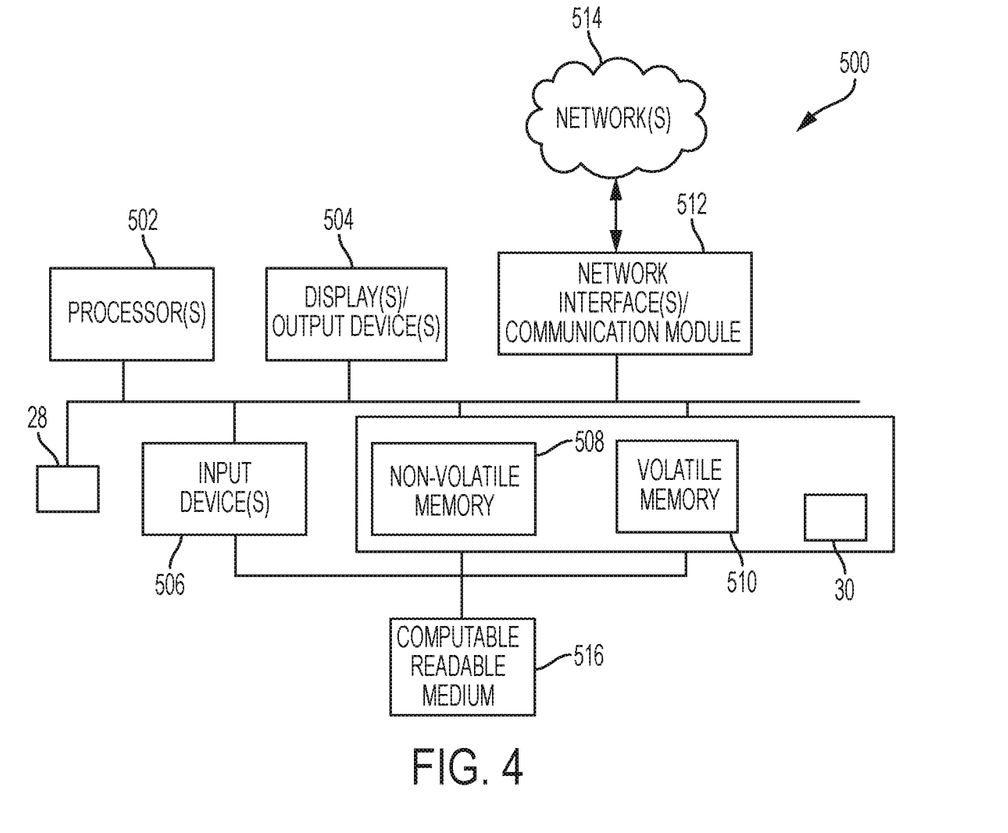
FIG. 4 depicts a schematic illustration of a system including a rack leg imaging module system and for implementing computer and software based methods to utilize the rack leg imaging module of FIG. 2, according to one or more embodiments shown and described herein.

The embodiments described herein can comprise a system 500 including one or more vehicular processors such as processors 502 (FIG. 4) communicatively coupled to the camera 304 and a memory. In embodiments, the processors 502 may include a vehicle position calibration processor and/or an image capture processor. A network interface hardware 512 may facilitate communications over a network 514 via wires, a wide area network, a local area network, a personal area network, a cellular network, a satellite network, and the like. Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM. The network interface hardware 512 can be communicatively coupled to any device capable of transmitting and/or receiving data via the network 514. Accordingly, the network interface hardware 512 can include a communication transceiver for sending and/or receiving any wired or wireless communication. For example, the network interface hardware 512 may include an antenna, a modem, LAN port, Wi-Fi card, WiMax card, mobile communications hardware, near-field communication hardware, satellite communication hardware and/or any wired or wireless hardware for communicating with other networks and/or devices.

The one or more processors 502 can execute machine readable instructions to implement any of the methods or functions described herein automatically. Memory as at least one of non-volatile memory 508 or volatile memory 510 in a computer readable medium 516 (e.g., memory) for storing machine readable instructions can be communicatively coupled to the one or more processors 502, the camera 304, or any combination thereof. The one or more processors 502 can comprise a processor, an integrated circuit, a microchip, a computer, or any other computing device capable of executing machine readable instructions or that has been configured to execute functions in a manner analogous to machine readable instructions. The computer readable medium 516 can comprise RAM, ROM, a flash memory, a hard drive, or any non-transitory device capable of storing machine readable instructions.

The one or more processors 502 and the memory may be integral with the camera 304. Alternatively or additionally, each of the one or more processors 502 and the memory can be integral with the materials handling vehicle 102. Moreover, each of the one or more processors 502 and the memory can be separated from the materials handling vehicle 102 and the camera 304. For example, a management server, server, or a mobile computing device can comprise the one or more processors 502, the memory, or both. It is noted that the one or more processors 502, the memory, and the camera 304 may be discrete components communicatively coupled with one another without departing from the scope of the present disclosure. Accordingly, in some embodiments, components of the one or more processors 502, components of the memory, and components of the camera 304 can be physically separated from one another. The phrase "communicatively coupled," as used herein, means that components are capable of exchanging data signals with one another such as, for example, electrical signals via conductive medium, electromagnetic signals via air, optical signals via optical waveguides, or the like.

Thus, embodiments of the present disclosure may comprise logic or an algorithm written in any programming language of any generation (e.g., 1GL, 2GL, 3GL, 4GL, or 5GL). The logic or an algorithm can be written as machine language that may be directly executed by the processor, or assembly language, object-oriented programming (OOP), scripting languages, microcode, etc., that may be compiled or assembled into machine readable instructions and stored on a machine readable medium such as computer readable medium 516. Alternatively or additionally, the logic or algorithm may be written in a hardware description language (HDL). Further, the logic or algorithm can be implemented via either a field-programmable gate array (FPGA) configuration or an application-specific integrated circuit (ASIC), or their equivalents.

In embodiments, one or more warehouse maps 30 described herein may be stored in the memory. The system 500 can include one or more displays and/or output devices 504 such as monitors, speakers, headphones, projectors, wearable-displays, holographic displays, and/or printers, for example. Output devices 504 may be configured to output audio, visual, and/or tactile signals and may further include, for example, audio speakers, devices that emit energy (radio, microwave, infrared, visible light, ultraviolet, x-ray and gamma ray), electronic output devices (Wi-Fi, radar, laser, etc.), audio (of any frequency), etc.

The system 500 may further include one or more input devices 506 which can include, by way of example, any type of mouse, keyboard, disk/media drive, memory stick/thumb-drive, memory card, pen, touch-input device, biometric scanner, voice/auditory input device, motion-detector, camera, scale, and the like. Input devices 506 may further include cameras (with or without audio recording), such as digital and/or analog cameras, still cameras, video cameras, thermal imaging cameras, infrared cameras, cameras with a charge-couple display, night-vision cameras, three dimensional cameras, webcams, audio recorders, and the like. For example, an input device 506 may include the camera 304 described herein. As a non-limiting example, the input device 506 may be communicatively coupled to a rack leg imaging module system 28 including the camera 304 of the rack leg imaging module 300 as described herein.

Figure 5:
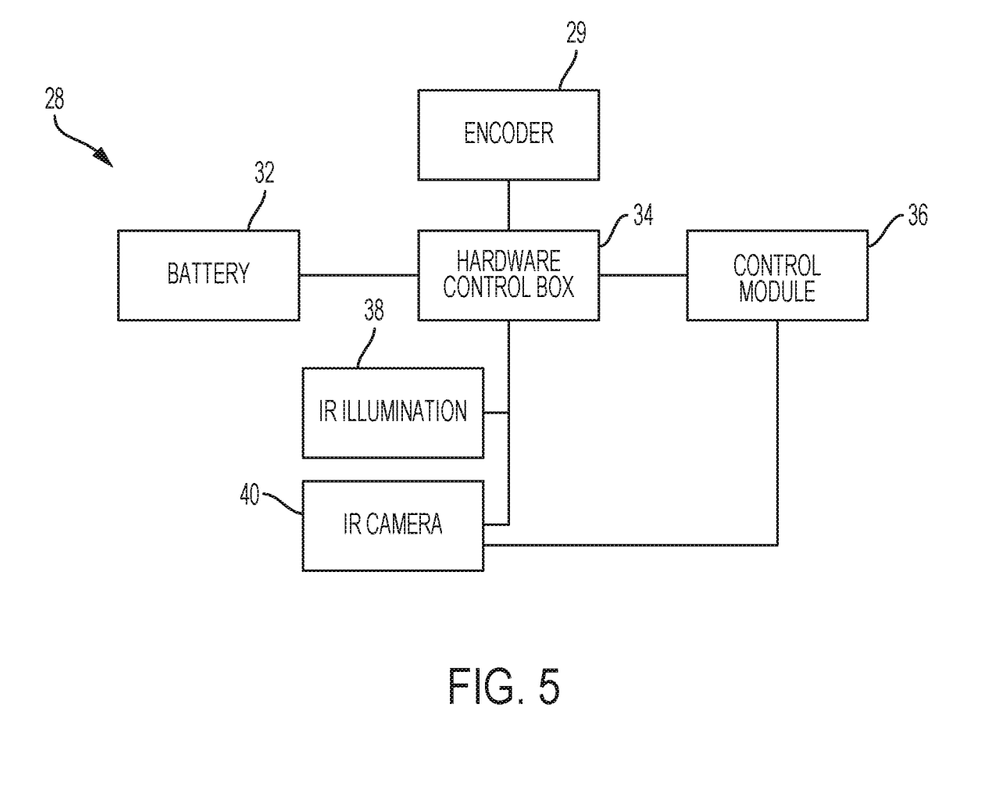
FIG. 5 depicts a schematic illustration of the rack leg imaging module system of FIG. 4.

Referring to FIG. 5, the rack leg imaging module system 28 includes communicatively coupled components including, but not limited to, an odometry module 29, a hardware control box 34, a control module 36, an infrared (IR) illumination module 38, an IR camera module 40, and a battery 32. In embodiments, the battery 32 may be a vehicle battery of the materials handling vehicle 102 or a separate battery dedicated to the rack leg imaging module system 28. The hardware control box 34 may include an internal layout with a light emitting diode (LED) driver to regulate electrical current to a plurality of LEDs as a plurality of illuminators 306, a microcontroller to count ticks of the odometry module 29, and a DC-DC converter to power the camera 304. The odometry module 29 may be any conventional or yet to be developed odometry module configured to generate materials handling vehicle odometry data, such as via a wheel encoder of the materials handling vehicle 102.

The IR illumination module 38 may comprise the plurality of illuminators 306 of the rack leg imaging module 300 as described herein, and the IR camera module 40 may comprise the camera 304 of the rack leg imaging module 300 as described herein. As a non-limiting example and embodiment, the rack leg imaging module system 2 includes the rack leg imaging module 300 including the camera 304 and the plurality of illuminators 306, LED drivers including an on/off digital control configured to control the plurality of illuminators 306, an odometry module 29, the control module 36, and DC-DC converters to power from the battery 32 to the connected hardware. The control module 36 is configured to trigger images captured by the camera 304, accumulate encoder ticks as described in greater detail below, and report tick information to the one or more processors 502 through serial communication. The control module 36 may further be configured to operate in two modes, a QR initialization mode to initialize an initial position of the materials handling vehicle 102 in an aisle entrance of a racking system aisle 70' in the warehouse 11 and a position maintenance mode to maintain and update the position of the materials handling vehicle 102 in the racking system aisle 70' during travel on the inventory transit surface 106, as described in greater detail below. Modes and parameters of the rack leg imaging module system 28 may be set by sending serial commands to the control module 36, which may operate as one of the one or more processors 502 of the system 500.

The rack leg imaging module system 28 may be communicatively coupled to a controller access network (CAN) bus of the materials handling vehicle 102 and may utilize an associated wire guidance or rail guidance signal of the materials handling vehicle 102 for localization. The rack leg imaging module system 28 may further make use of CAN odometry data associated with the materials handling vehicle 102, and publish the position to CAN, for automatic positioning system and navigation use. The rack leg imaging module system 28 may operate with the CAN interface of the materials handling vehicle 102 to provide rack leg imaging to the materials handling vehicle 102. The rack leg imaging module system 28 may further maintain position of the materials handling vehicle 102 in an onboard memory, even when power of the materials handling vehicle 102 is turned off.

As is noted above and referring again to FIG. 4, the materials handling vehicle 102 can comprise or be communicatively coupled with the one or more processors 502. Accordingly, the one or more processors 502 can execute machine readable instructions to operate or replace the function of the operator controls. The machine readable instructions can be stored upon the memory. Accordingly, in some embodiments, the materials handling vehicle 102 can be navigated automatically by the one or more processors 502 executing the machine readable instructions. In some embodiments, the location of the vehicle can be monitored by the localization system as the materials handling vehicle 102 is navigated.

For example, the materials handling vehicle 102 can automatically navigate along the inventory transit surface 106 of the warehouse 11 along a desired path to a desired position based upon a localized position of the materials handling vehicle 102. In some embodiments, the materials handling vehicle 102 can determine the localized position of the materials handling vehicle 102 with respect to the warehouse 11. The determination of the localized position of the materials handling vehicle 102 can be performed by comparing image data to map data. The map data can be stored locally in the memory as one or more warehouse maps 30, which can be updated periodically, or map data provided by a server or the like. In embodiments, an industrial facility map comprises a mapping of the racking system features, such as each end rack leg 408 of each upright rail 406 of a rack 400 of the racking system 12 at each aisle end, where each end rack leg 408 is associated with a unique code, including but not limited to codes such as QR codes on aisle entry identifiers 302 including rack leg identification information as described herein. Given the localized position and the desired position, a travel path can be determined for the materials handling vehicle 102. Once the travel path is known, the materials handling vehicle 102 can travel along the travel path to navigate the inventory transit surface 106 of the warehouse 11. Specifically, the one or more processors 502 can execute machine readable instructions to perform localization system functions and operate the materials handling vehicle 102. In one embodiment, the one or more processors 502 can adjust the steering of the wheels 210 and control the throttle to cause the materials handling vehicle 102 to navigate the inventory transit surface 106.

Figure 2:
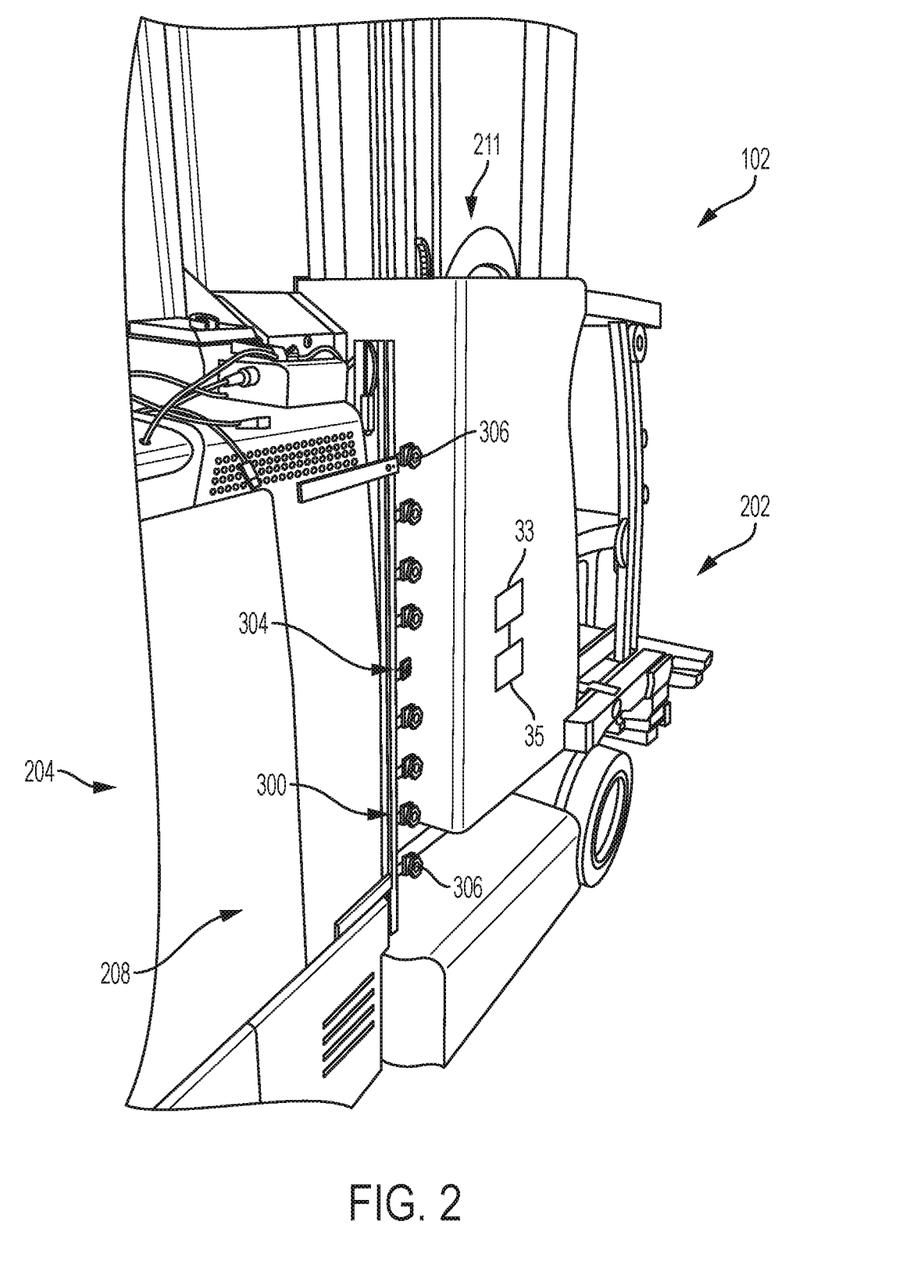
FIG. 2 depicts a rack leg imaging module on a vehicle of the plurality of vehicles of FIG. 1A, according to one or more embodiments shown and described herein.

Referring to FIG. 2, a rack leg imaging module 300 is shown disposed on a lateral side 208 of a materials handling vehicle 102 between the power unit side 204 and the fork side 202. The rack leg imaging module 300 is further shown as including an arrangement of a camera 304 and an illumination module including a plurality of illuminators 306. The rack leg imaging module 300 may include the camera 304 and a vertically oriented array of infrared (IR) illuminators 306 and an IR bandpass filter. The vertically-oriented array of IR illuminators may be disposed on at least one of the pair lateral sides 208 of the materials handling vehicle 102. The camera 304 may be vertically aligned with the vertically oriented array of IR illuminators 306 and configured to capture images of at least a portion of a rack leg 408 positioned in a racking system aisle 70' of a multilevel warehouse racking system 12. An image capture processor (e.g., of the processors 502) may be configured to generate a filtered IR rack leg image by coordinating to capture of a rack leg image of at least a portion of a rack leg 408 with illumination of the rack leg 408 by the vertically oriented array of IR illuminators 306 and with band pass filtering of external warehouse lighting surrounding the rack leg 408 from the rack leg image using the IR bandpass filter. The vehicle control architecture may be configured to navigate the materials handling vehicle 102 along the inventory transit surface 106 using the filtered IR rack leg image.

In an embodiment, the camera 304 may include a lens and the IR bandpass filter. The lens may be, but is not limited to, a wide angle lens, a fish eye lens, a narrow angle lens, or the like. The lens may be dependent on a leg pattern used for a rack leg 408 in the warehouse environment 150. The plurality of illuminators 306 of the illumination module may include, but are not limited to, a plurality of LEDs or other types of illumination such as incandescent, fluorescent, IR laser diode, and the like. As a non-limiting example, the plurality of illuminators 306 of the illumination module may include a vertical series of distributed IR LEDs, each including a narrow beam reflector lens. The rack leg imaging module 300 is mounted on at least one lateral side 208 of the materials handling vehicle 102 and configured to laterally face a rack 400 in first lateral direction, such as when the materials handling vehicle 102 is on wire guidance or rail guidance on the inventory transit surface 106 in a racking system aisle 70' defined by the rack 400. The materials handling vehicle 102 may include an opposite rack leg imaging module 300 mounted on the opposite lateral side 208 of the materials handling vehicle 102 and configured to laterally face in a second lateral direction opposite the first lateral direction another rack 400 defining another side of the racking system aisle 70'. Two rack leg imaging modules 300 mounted on opposite lateral sides 208 of the materials handling vehicle 102 allows both sides of the racking system aisle 70' to be utilized for localization, as described in greater detail further below.

Along with a unique code associated with a first aisle entry identifier 302 and the three-dimensional coordinates of the rack leg 408 associated with the first aisle entry identifier 302 to indicate location of the rack leg 408 in the warehouse environment based on the map, the patterns from an image of the rack leg 408 captured by the rack leg imaging module 300 are recorded in a localization feature map for use during localization system operation, as described in greater detail below. In an embodiment, mapping of the QR codes associated with rack legs 408 of racks 400 may occur through manual mapping utilizing a laser tool such as a laser range finder or laser distance meter or other suitable mapping scanning tools. In embodiments, utilized individual tags, such as RFID tags as described herein, may be mapped utilizing same or similar techniques while further using an antenna to identify a location of the individual tag.

The vehicle location of the materials handling vehicle 102 may be verified and/or made more accurate based on the rack leg imaging module 300 as described herein. For a vehicle that is localized but with low accuracy, for example, use of the rack leg imaging module 300 and an aisle entry identifier 302 permits an increase in localization accuracy of the materials handing vehicle 102 upon successful detection of the aisle entry identifier 302. The aisle entry identifier 302 is able to be utilized to initialize a vehicle location or verify the predicted vehicle location and to fix the vehicle localization to a high degree of certainty. Increased uptime in the length of time a materials handling vehicle 102 may be localized through the localization system through use of such rack leg imaging modules 300 enhances value of the vehicle localization in the uptime and in improving accuracy of the localization. By way of example and not as a limitation, uptime associated with the materials handling vehicle 102 references the amount of time the materials handling vehicle 102 may be utilized and not lost, turned off, or otherwise not utilized during periods of downtime. An unknown location of the materials handling vehicle 102 results in disruption of uptime associated with the materials handling vehicle 102 resulting in situations such as inhibited work flow and inefficient vehicle navigation and use. As a non-limiting example, the materials handling vehicle 102 wills top if it becomes lost such that the localization is no longer known, navigation could lead to an incorrect target or pick up location if the localization is incorrect, and the like.

Figure 6:
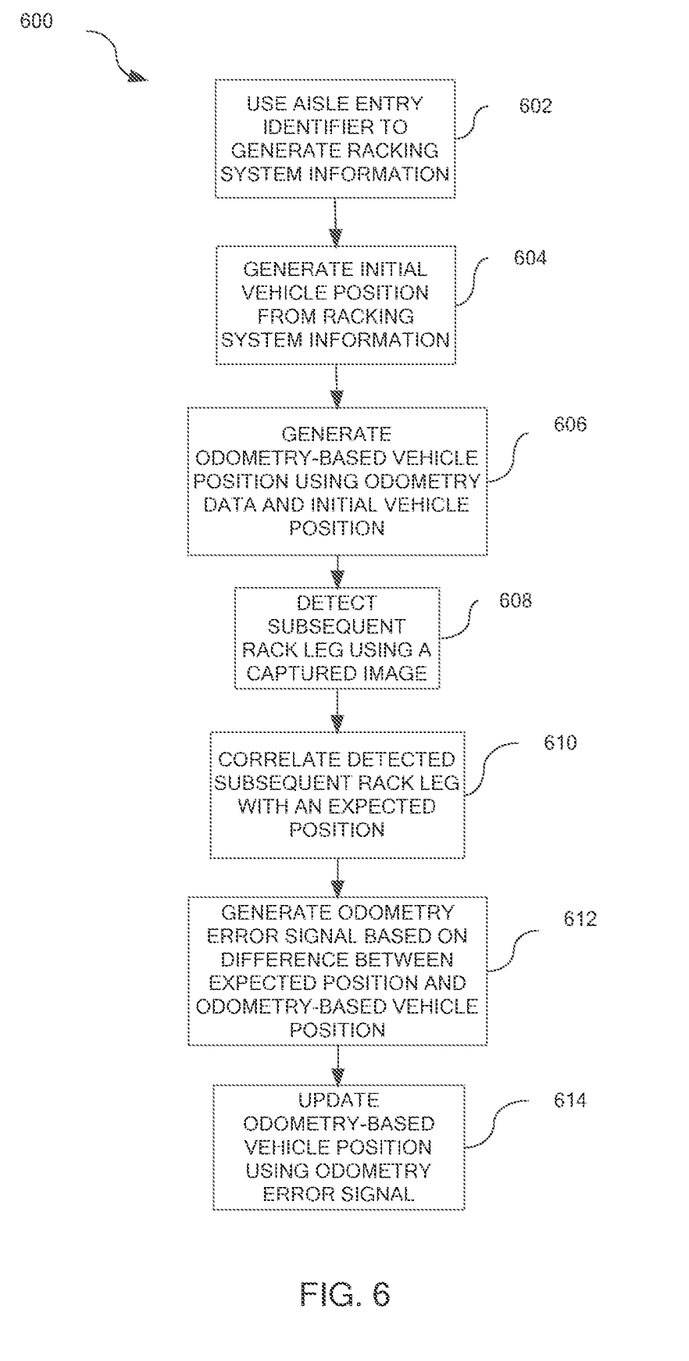
FIG. 6 depicts a flowchart overview of a method for a localization method according to one or more embodiments shown and described herein.

The processes of the rack leg imaging module 300 is set forth in greater detail in FIG. 6. The camera 304 and illuminators 306 of the rack leg imaging module may capture an image of a rack leg 408 that is digitized and may have a stored rack leg pattern superimposed on the digitized image to match the image with a stored rack leg 408.

Referring to FIG. 6, the system 500 through rack leg imaging module system 28 and the camera 304 of the rack leg imaging module 300 is configured to provide rack leg imaging for one or more vehicles 102 that may be disposed on wire guidance or rail guidance in racking system aisles 70' of a warehouse 11. The camera is configured to capture images of (i) an aisle entry identifier 302 positioned to correspond with an entrance of a racking system aisle 70' of a multilevel warehouse racking system 12 and (ii) at least a portion of a rack leg 408 positioned in the racking system aisle 70'. By way of example and not as a limitation, the system 500 is configured to use the camera 304 of the rack leg imaging module 300 to read the aisle entry identifier 302 as a unique code associated with a first rack leg 408 of a rack 400 at an aisle entrance and use odometry data from an odometry module 29, such as a wheel encoder on the materials handling vehicle 102, to keep track of a change in position of the materials handling vehicle 102. The odometry module 29 is configured to generate odometry data representing a distance traveled by the materials handling vehicle 102 along the inventory transit surface 106. The camera 304 is used to continue to identify rack legs 408 that are passed by in the racking system aisle 70' and use of the identifying information to correct any accumulated encoder error and thus calibrate odometry information and the updated position of the materials handling vehicle 102. Parameters associated with the system 500 may be split between storage onboard the rack leg imaging module 300 and storage within each unique code associated with a rack leg 408.

As a non-limiting example, the process 600 follows instructions to capture image(s) of a rack leg 408 at an aisle entrance of a first racking system aisle 70' to initialize a localization position of the materials handling vehicle 102 in the warehouse 11 with respect to the first racking system aisle 70'. As a non-limiting example, the rack leg 408 defines at least a portion of a lateral boundary of the racking system aisle 70' that may be the aisle entrance of the first racking system aisle 70' and includes an aisle entry identifier 302, which may be configured as a sticker on the rack leg 408 including the aisle entry identifier 302 as a unique QR code. The unique QR code may include localization information with respect to the rack leg 408 and information about rack leg patterns associated with the rack legs 408 of a rack 400, such as hole patterns, spacing or "tick" patterns between rack legs 408 of the rack 400, and the like. A plurality of images are captured at a high rate by the camera 304 to read the unique QR code at the aisle entrance, which includes a stored position of the associated rack leg 408, and initialize the position of the materials handling vehicle 102 in the warehouse 11.

Thus, in block 602, the aisle entry identifier 302 is used to generate racking system information indicative of at least (i) a position of an initial rack leg 408 of the racking system aisle 70' along the inventory transit surface 106 and (ii) rack leg spacing in the racking system aisle 70'. In block 604, the initial position of the materials handling vehicle 102 along the inventory transit surface 106 is generated using the position of the initial rack leg 408 from the racking system information. It is noted that reference herein to a value or parameter that is "generated" covers calculating, measuring, estimating, or any combination thereof. The rack leg imaging module 300 may be commissioned with a known position of the materials handling vehicle 102 such that the updated position of the materials handling vehicle 102 is calculated based on the retrieved position of the associated rack leg 408. A position of the QR code in the captured image(s) may be used for fine adjustment of the position of the materials handling vehicle 102, given known camera parameters and optionally a distance of the camera 304 from the rack 400 that may assist, for example, with setting one or more camera parameters based on a the camera distance to capture an optimal, defined image of the rack leg 408.

After initialization in blocks 602-604, the odometry module 29 of the materials handling vehicle 102 is used to maintain vehicle position knowledge. In block 606, an odometry-based position of the materials handling vehicle 102 along the inventory transit surface 106 in the racking system aisle 70' is generated using the odometry data and the initial position of the materials handling vehicle 102. In an embodiment, the rack leg imaging module 300 is commissioned with a known distance travelled per tick and a polarity or direction of travel. Such odometry information is used between the rack legs 408 and captured images of the rack legs to estimate and maintain vehicle position knowledge from a previous image capture. As a non-limiting example, a last image capture is a foundation upon which the odometry is based until a new image is captured to become the last image capture to continue to maintain the vehicle position knowledge as the materials handling vehicle 102 advances along the racking system aisle 70'.

In block 608, a subsequent rack leg 408 is detected using a captured image of at least a portion of the subsequent rack leg 408. For example, images continue to be captured by the camera 304 as the materials handling vehicle 102 travels along the racking system aisle 70' defined by the rack 400 to detect the plurality of rack legs 408 of the rack 400 defining the racking system aisle 70'. Images may be captured by the camera 304 at a high rate as the materials handling vehicle 102 travels along the racking system aisle 70' defined by a rack 400 and including a plurality of rack legs 408. In embodiments, the images may be captured by the camera 304 when the rack leg imaging module 300 expects a rack leg 408 to be in the frame. For example, the camera 304 may be triggered to take an image at a position where a rack leg 408 is expected to appear in the image, which may reduce image processing requirements and camera interface bandwidth requirements as well as power usage.

In block 610, the detected subsequent rack leg 408 is correlated with an expected position of the materials handling vehicle 102 in the racking system aisle 70' using rack leg spacing from the racking system information. As a non-limiting example, such data associated with an expected position of the rack leg 408 and thus associated with an expected position of the materials handling vehicle 102 when at the rack leg 408 may be based on information from the unique code, such as the QR code of the aisle entry identifier 302 and/or the RFID tag of the tag layout 50. Such data may include information of when to trigger a subsequent image capture to capture an image of a subsequent expected rack leg 408 as a next expected data point. A tolerance with respect to that next expected data point may be included as well before and after the data point. In an embodiment, an expected position may be calculated by adding a distance between rack legs 408 in a racking system aisle 70' defined by a rack 400 in units of ticks to a previous number of ticks associated with when the last rack leg 408 was detected. The previous number of ticks may be corrected for offset of the rack leg 408 in the image. The camera 304 and the plurality of illuminators 306 may then be triggered to light and capture an image 450 to detect an expected rack leg 408 when the number of ticks hits a target tick count threshold number.

Figure 3:
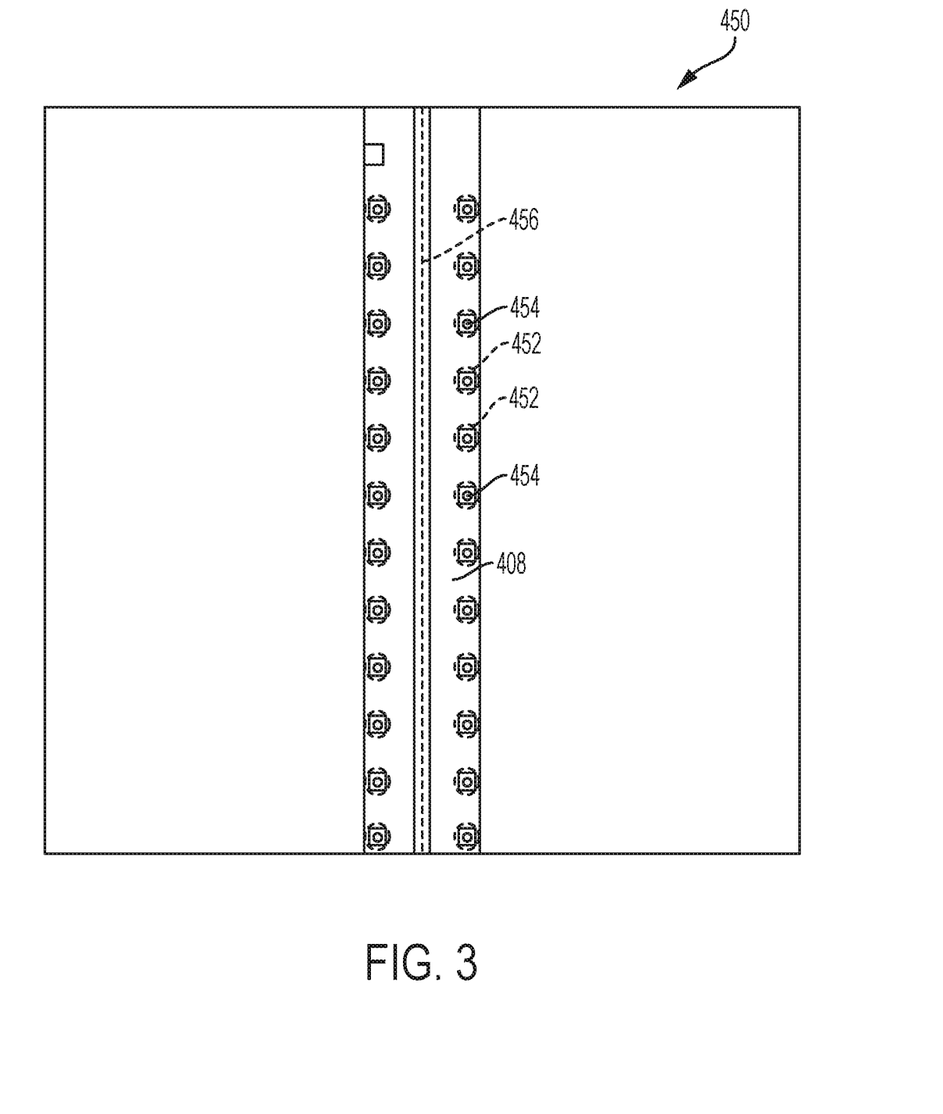
FIG. 3 depicts an image of a rack leg feature of the warehouse racking system of FIG. 1A as captured by the rack leg imaging module of FIG. 2, according to one or more embodiments shown and described herein.

Referring to FIG. 3, an image 450 is captured by the camera 304 to show a detected rack leg 408. Circles 452 are disposed on detected holes of the detected rack leg 408, and an expected dot pattern 454 is matched to those detected holes of the rack leg 408 to generate a best-fit centerline 456. In such embodiments, such features of a rack leg 408 of a rack 400 in the image 450 may be used as features to detect and identify the rack leg 408 due to a common hole pattern distinguished by a computer vision system of the camera 304 and the rack leg imaging module 300 and a pre-identified spacing between the rack legs 408 of the rack 400, which information may be included in the aisle entry identifier 302 of the first rack leg 408 of a racking system aisle 70' defined by the rack 400 of the multilevel warehouse racking system 12. Use of the plurality of illuminators 306 configured to provide flash illumination and the camera 304 configured to capture images with short exposure times using, for example, a global shutter camera, allows for features of the detected rack leg 408 to be captured and identified in the image 450. Further, such a combination of illumination and image capture provides a high contrast image such as the image 450 through illumination of an image foreground and providing a sharp image through prevention of motion blur. Such image characteristics permit image processing that provides reliable and accurate detection of a position of the detected rack leg 408. The IR illumination module 38 and the IR bandpass filter on the IR camera module 40 of the rack leg imaging module system 28 respectively associated with the plurality of illuminators 306 and the camera 304 of the rack leg imaging module 300 operate to permit most of the external lighting extraneous to image capture, such as warehouse lighting, to be ignored and filtered out of the image 450. Further, in embodiments where the rack legs 408 are unpainted, are light in color, and/or have a glossy paint coating, a widely spaced vertical array of the plurality of illuminators 306 may operate to mitigate the specular reflective nature of rack legs 408 to detect a rack leg 408 in an image 450. A process of illuminating a rack leg 408 through the plurality of illuminators 306 for image capture by the camera 304 of the rack leg imaging module 300 may include illumination of a large vertical area of the rack leg 408 to generate a large vertical field of view for the camera 304 due to a short range of the camera 304 to the rack 400 to capture a large area of the rack leg 408 in the image 450. Further, the rack legs 408 of the rack 400 may include highly reflective material, and a distributed light source as provided by the plurality of illuminators 30 of the rack leg imaging module 300 is configured to mitigate the high reflective nature of the rack leg 408 to provide a sharp and reliable image 450 of a detected rack leg 408.

In the process 600, the odometry-based position of the materials handling vehicle 102 is compared with the expected position of the materials handling vehicle 102. In block 612, an odometry error signal is generated based on a difference between the expected position and the odometry-based position. In embodiments indicative of a match between the expected position and the odometry-based position, the odometry error signal may be zero. In block 614, the odometry-based position of the materials handling vehicle 102 is updated using the odometry error signal. Thus, the detected rack leg 408 is used to update a position of the materials handling vehicle 102. Each frame is processed to detect a rack leg 408 and, when the rack leg 408 is detected, the frame is processed by a processor 502 of the system 500 to accurately update the position of the materials handling vehicle 102 to prevent accumulated error of odometry data from the estimated maintained position of the materials handling vehicle 102 based on the odometry module 29 from growing at an unbounded rate. The vehicle control architecture is configured to navigate the materials handling vehicle 102 along the inventory transit surface 106 using the updated odometry-based position. In embodiments, the vehicle control architecture is configured to track the navigation of the materials handling vehicle 102 along the inventory transit surface 106 of the racking system aisle 70', navigate the materials handling vehicle 102 along the inventory transit surface 106 in at least a partially automated manner, or both, using the updated odometry-based position.

In embodiments, through use of detection of rack legs 408 in a given racking system aisle 70' to initialize, maintain, and update a position of the materials handling vehicle 102 in the given racking system aisle 70' as described herein through the rack leg imaging module 300, commissioning of a system 500 to utilize the rack leg imaging module 300 involves simple installation and commission. For example, the system 500 may only require aisle entry identifiers 302 such as QR code stickers to be placed at the entrances of each racking system aisle 70'. Further, the system 500 involves a simplified commissioning as information for the aisle entry identifier 302 is measured on site, input into a mobile computer, and printed on a mobile sticker printer to generate a mobile sticker with a unique QR code to be placed on an associated first rack leg 408 for each racking system aisle entrance in the warehouse 11. Thus, warehouse specific information does not need to be stored on any materials handling vehicle 102 for the system 500 as described herein to operate, resulting in a reduction in commissioning time over systems in which such warehouse specific information is required to be stored on the materials handling vehicle 102. Further, a close, predictable spacing of rack legs 408 in a given racking system aisle 70' relaxes requirements on the accuracy of the odometry module 29 as there is less accumulation of encoder error between closely spaced, predicable features of the rack legs 408 than there might otherwise be for a system including further spaced and manually placed global features, such as RFID tags in a warehouse floor.

The embodiments and systems described herein permit determination and accurate maintenance of a position of a materials handling vehicle 102 with positional accuracy in a racking system aisle 70' of the warehouse 11. Indeed, a combination of use of aisle entry identifiers 302 such as QR codes for position initialization of a materials handling vehicle 102 at aisle entrances and subsequent use of existing, regularly spaced features of rack legs 408 for a given racking system aisle 70' to maintain an accurate position of the materials handling vehicle 102 along the racking system aisle 70' permits not requiring use of a QR code on each rack leg 408 to maintain and update vehicle position of a materials handling vehicle 102 along the given racking system aisle 70'. For example, a given rack 400 for a racking system aisle 70' may be over a hundred meters long and may have over 40 rack legs 408.

For the purposes of describing and defining the present disclosure, it is noted that reference herein to a variable being a "function" of or "based on" a parameter or another variable is not intended to denote that the variable is exclusively a function of the listed parameter or variable. Rather, reference herein to a variable that is a "function" of or "based on" a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" in a particular way, to embody a particular property, or to function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present disclosure it is noted that the term "about" is utilized herein to represent the inherent degree of uncertainty that may be attributed to any quantitative comparison, value, measurement, or other representation. The term "about" is also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

What is claimed is:

1. A materials handling vehicle comprising
   a camera,
   an odometry module,
   a vehicle position calibration processor,
   a drive mechanism configured to move the materials handling vehicle along an inventory transit surface, and
   vehicle control architecture in communication with the drive mechanism, wherein:
   the camera is configured to capture images of (i) an aisle entry identifier positioned to correspond with an entrance of a racking system aisle of a multilevel warehouse racking system and (ii) at least a portion of a rack leg positioned in the racking system aisle;
   the odometry module is configured to generate odometry data representing a distance traveled by the materials handling vehicle along the inventory transit surface;
   the vehicle position calibration processor is configured to
      use the aisle entry identifier to generate racking system information indicative of at least (i) a position of an initial rack leg of the racking system aisle along the inventory transit surface and (ii) rack leg spacing in the racking system aisle,
      generate an initial position of the materials handling vehicle along the inventory transit surface using the position of the initial rack leg from the racking system information,
      generate an odometry-based position of the materials handling vehicle along the inventory transit surface in the racking system aisle using the odometry data and the initial position of the materials handling vehicle,
      detect a subsequent rack leg using a captured image of at least a portion of the subsequent rack leg,
      correlate the detected subsequent rack leg with an expected position of the materials handling vehicle in the racking system aisle using rack leg spacing from the racking system information,
      compare the odometry-based position of the materials handling vehicle with the expected position of the materials handling vehicle to generate an odometry error signal based on a difference between the expected position and the odometry-based position, and
      update the odometry-based position of the materials handling vehicle using the odometry error signal; and
   the vehicle control architecture is configured to navigate the materials handling vehicle along the inventory transit surface using the updated odometry-based position.

2. The materials handling vehicle of claim 1, wherein the aisle entry identifier comprises a Quick Response (QR) code configured to store and provide the racking system information.

3. The materials handling vehicle of claim 2, wherein the position of the initial rack leg of the racking system aisle along the inventory transit surface is stored in a warehouse map.

4. The materials handling vehicle of claim 2, wherein the racking system information further comprises:
   information about a hole pattern associated with a set of rack legs of the racking system aisle of the multilevel warehouse racking system, the set of rack legs including the initial rack leg, information about distances between adjacent rack legs of the set of rack legs, distance of a rack face of the racking system aisle of the multilevel warehouse racking system to a guidance wire in the racking system aisle, a number of rack legs of the set of rack legs of the racking system aisle of the multilevel warehouse racking system, or combinations thereof.

5. The materials handling vehicle of claim 4, wherein the information about the hole pattern comprises distances between rows of holes and distances between columns of holes of each rack leg of the racking system aisle of the multilevel warehouse racking system.

6. The materials handling vehicle of claim 1, wherein the camera is configured to capture images to detect the subsequent rack leg based on a trigger, the trigger comprising the expected position at which the subsequent rack leg is expected based on the racking system information generated from the aisle entry identifier.

7. The materials handling vehicle of claim 6, wherein the aisle entry identifier comprises a QR code, an RFID tag of a tag layout of the racking system aisle, or combinations thereof.

8. The materials handling vehicle of claim 6, wherein the racking system information further comprises information regarding a distance between rack legs in the racking system aisle, and the expected position is calculated by adding the distance between rack legs in the racking system aisle to a previous distance associated with a previously detected rack leg.

9. The materials handling vehicle of claim 1, further comprising a rack leg imaging module, the camera communicatively coupled to the rack leg imaging module, the rack leg imaging module further comprising a plurality of illuminators.

10. The materials handling vehicle of claim 9, wherein the rack leg imaging module is disposed on a lateral side of the materials handling vehicle configured to laterally face the rack legs of the racking system aisle of the multilevel warehouse racking system.

11. The materials handling vehicle of claim 9, wherein the rack leg imaging module comprises an infrared (IR) bandpass filter, the camera comprises a lens, and the plurality of illuminators comprise a vertically oriented array of IR illuminators, and the IR bandpass filter is configured to operate with the plurality of illuminators to filter external warehouse lighting surrounding a detected rack leg from the images.

12. The materials handling vehicle of claim 11, wherein the lens of the camera comprises a wide angle lens, a fish eye lens, or a narrow angle lens.

13. The materials handling vehicle of claim 11, wherein each distributed IR LED comprises a narrow beam reflector lens.

14. The materials handling vehicle of claim 1, wherein a warehouse environment map comprises a warehouse map of the multilevel warehouse racking system in a warehouse environment, the warehouse map comprising the position of each initial rack leg of the racking system aisle along the inventory transit surface at each end of the racking system aisle.

15. The materials handling vehicle of claim 14, wherein each initial rack leg at each end of the racking system aisle comprises a respective aisle entry identifier, each aisle entry identifier comprising respective racking system information.

16. The materials handling vehicle of claim 1, further comprising a materials handling mechanism configured to place goods on and retrieve goods from the multilevel warehouse racking system of a warehouse environment, wherein the vehicle control architecture is in communication with the materials handling mechanism.

17. The materials handling vehicle of claim 1, wherein the vehicle control architecture is configured to track the navigation of the materials handling vehicle along the inventory transit surface of the racking system aisle, navigate the materials handling vehicle along the inventory transit surface in at least a partially automated manner, or both, using the updated odometry-based position.

18. A materials handling vehicle comprising
a camera,
an odometry module,
a vehicle position calibration processor, and
a drive mechanism configured to move the materials handling vehicle along an inventory transit surface, wherein:
the camera is configured to capture images of at least (i) an aisle entry identifier for a racking system aisle of a multilevel warehouse racking system and (ii) at least a portion of a rack leg positioned in the racking system aisle;
the odometry module is configured to generate materials handling vehicle odometry data; and
the vehicle position calibration processor is configured to
use the aisle entry identifier to generate racking system information indicative of at least (i) a position of an initial rack leg along the inventory transit surface and (ii) rack leg spacing in the racking system aisle,
generate an initial position of the materials handling vehicle along the inventory transit surface using the position of the initial rack leg,
generate an odometry-based position of the materials handling vehicle along the inventory transit surface in the racking system aisle using the odometry data and the initial position of the materials handling vehicle,
detect a subsequent rack leg using a captured image of at least a portion of the subsequent rack leg,
correlate the detected subsequent rack leg with an expected position of the materials handling vehicle in the racking system aisle using rack leg spacing from the racking system information,
generate an odometry error signal based on a difference between the expected position and the odometry-based position, and
update the odometry-based position of the materials handling vehicle using the odometry error signal.

19. A materials handling vehicle comprising
a drive mechanism configured to move the materials handling vehicle along a horizontally-oriented inventory transit surface in a forward direction defining a front of the materials handling vehicle or a reverse direction defining a rear of the materials handling vehicle,
a materials handling mechanism configured to move materials along a vertically-oriented materials handling axis,
a vehicle body comprising a pair of lateral sides extending between the front and rear of the materials handling vehicle,
a rack leg imaging module comprising a camera, a vertically oriented array of infrared (IR) illuminators, and an IR bandpass filter, an image capture processor, and vehicle control architecture in communication with the drive mechanism, wherein:

the vertically-oriented array of IR illuminators is disposed on at least one of the pair of lateral sides of the materials handling vehicle;

the camera is vertically aligned with the vertically oriented array of IR illuminators and is configured to capture images of at least a portion of a rack leg positioned in a racking system aisle of a multilevel warehouse racking system;

the image capture processor is configured to generate a filtered IR rack leg image by coordinating to capture of a rack leg image of at least a portion of a rack leg with illumination of the rack leg by the vertically oriented array of IR illuminators and with band pass filtering of external warehouse lighting surrounding the rack leg from the rack leg image using the IR bandpass filter;

the vehicle control architecture is configured to navigate the materials handling vehicle along the horizontally-oriented inventory transit surface using the filtered IR rack leg image.

* * * * *